United States Patent
Kannapell

(10) Patent No.: US 7,185,852 B2
(45) Date of Patent: Mar. 6, 2007

(54) ACTUATOR WITH HELICAL CAM GUIDES

(75) Inventor: John Trouy Kannapell, Torrance, CA (US)

(73) Assignee: North Rop Grumman Corporation, Los Angeles, CA (US)

(*) Notice: Subject to any disclaimer, the term of this patent is extended or adjusted under 35 U.S.C. 154(b) by 240 days.

(21) Appl. No.: 10/953,230

(22) Filed: Sep. 29, 2004

(65) Prior Publication Data
US 2006/0065778 A1   Mar. 30, 2006

(51) Int. Cl.
*B64C 1/14* (2006.01)
(52) U.S. Cl. ..................... 244/129.4; 49/139
(58) Field of Classification Search .......... 244/129.3, 244/129.4, 129.5; 49/139, 280, 298
See application file for complete search history.

(56) References Cited

U.S. PATENT DOCUMENTS

| 2,373,085 | A | * | 4/1945 | Ackerman et al. ............ 49/139 |
| 3,315,413 | A | * | 4/1967 | Beecher et al. .............. 49/280 |
| 3,440,764 | A | * | 4/1969 | Cover ..................... 49/280 |
| 3,718,171 | A | * | 2/1973 | Godwin ................... 160/210 |
| 6,619,591 | B1 | * | 9/2003 | Erben et al. ............ 244/129.5 |
| 2003/0015048 | A1 | | 1/2003 | Schmidt et al. ............ 74/99 R |

* cited by examiner

*Primary Examiner*—Tien Dinh
(74) *Attorney, Agent, or Firm*—Louis L. Dachs

(57) ABSTRACT

The invention is an actuator assembly for actuating a door or aerodynamic surface of an aircraft. In detail, the invention includes a housing having first and second ends and a longitudinal axis. The housing center portion further includes first and second helical slots extending along the longitudinal axis. A cam follower, having first and second ends, is movably mounted in the center portion, the cam follower movable along the longitudinal axis of the housing. An actuator is provided for actuating the cam follower in first and second directions along the longitudinal axis. A bolt assembly, having first and second ends, is mounted through the cam follower with the first and second ends thereof extending into the first and second helical slots. First and second bearings are mounted to the first and second ends of bolt assembly such that the first and second bearings are movably mounted in the first and second helical slots. An actuation rod has its first end in the form of a clevis with first and second lugs movably connected to the first and second ends of the bolt assembly.

9 Claims, 6 Drawing Sheets

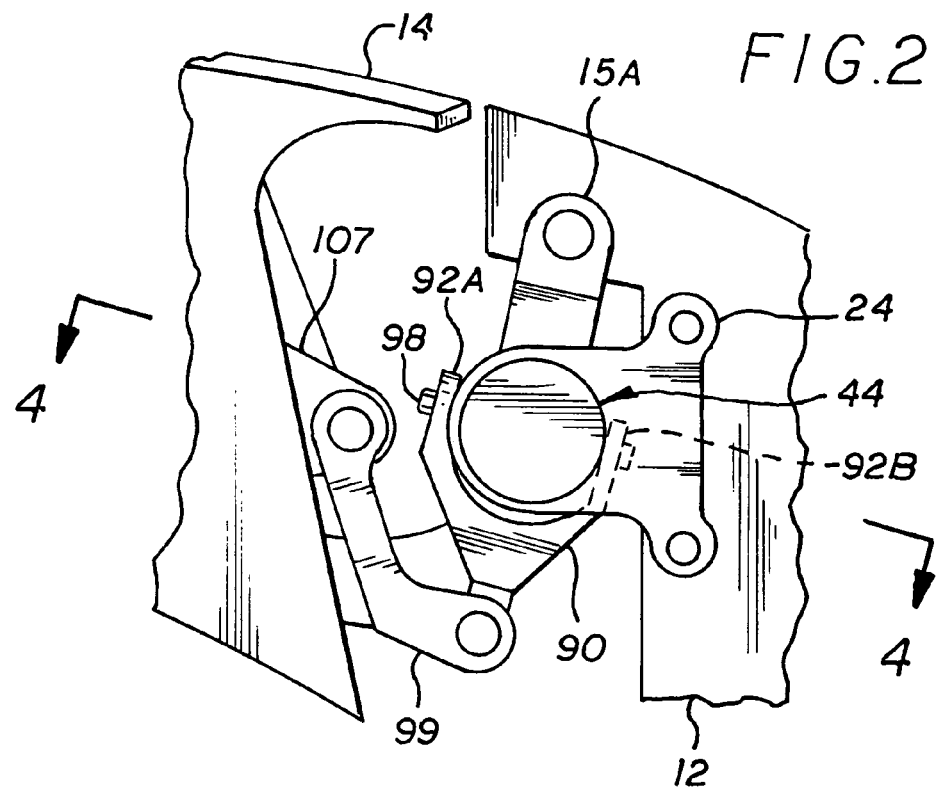
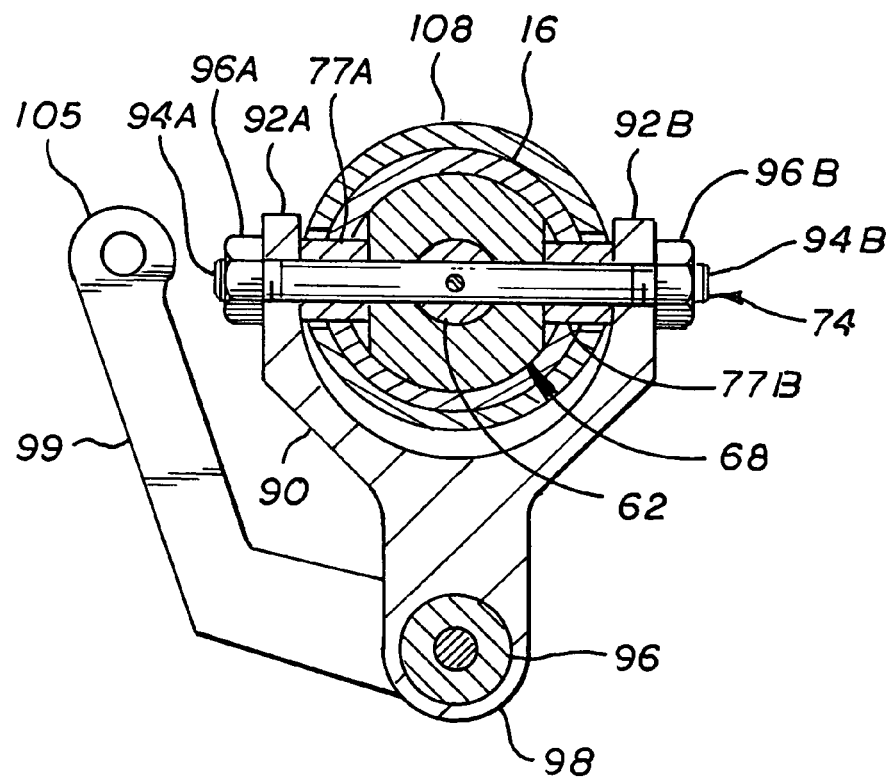

ACTUATOR WITH HELICAL CAM GUIDES

This invention was made under a United States Government contract NO.: N00019-02-C-3002, issued in 2001 awarded by the US Navy. Therefore, the United States Government has the rights to the invention provided by that contract.

BACKGROUND OF THE INVENTION

1. Field of the Invention

The invention relates to the field of actuators and, in particular, to an actuator for opening and closing aerodynamic control surfaces and doors on an aircraft and the like.

2. Description of Related Art

Actuating control surfaces and doors on aircraft is typically accomplished by means of a linear actuator mounted to the airframe and coupled by a linkage system to control surface or door. However, in some applications space prevents their usage. Thus a hydraulically or electrically operated rotary actuator is used. But these are generally large and require gear reduction systems.

Rotary actuators with helical cam guides have been used in various applications. For example, published patent application US 2003/0015048 A1 Transmission For A Stabilizer Arrangement For A Motor Vehicle Chassis by R. Schmidt, et al. discloses a screw drive with cams that engage two concentric sleeves with helical slots for rotating the sleeves in opposite directions. They have been used in door locks. However, no known prior art actuator system has converted the linear movement of output member of a hydraulic or pneumatic linear to rotate a door or in a plane perpendicular to the movement of the output member.

Thus, it is a primary object of the invention to provide an actuation device for moving a structure such as a door from one position (closed) to a second position (open).

It is a still further object of the invention to provide an actuator system for converting the linear movement of output member of a hydraulic or pneumatic linear actuator to rotate a door or the like in a plane perpendicular to the movement of the actuator.

It is another object of the invention to provide an actuation device for moving a structure such as a door from one position (closed) to a second position (open) using helical cams.

SUMMARY OF THE INVENTION

The invention is an actuator assembly for actuating a door or aerodynamic surface of an aircraft. In detail, the invention includes a housing having first and second ends and a longitudinal axis. The housing center portion further includes first and second helical slots extending along the longitudinal axis. A cam follower, having first and second ends, is movably mounted in the center portion, the cam follower movable along the longitudinal axis of the housing. An actuator assembly is provided for actuating the cam follower in first and second directions along the longitudinal axis. A bolt assembly, having first and second ends, is mounted through the cam follower with the first and second ends thereof extending into the first and second helical slots. First and second bearings are mounted to the first and second ends of bolt assembly such that the first and second bearings are movably mounted in the first and second helical slots. An actuation rod or drive yoke has its first end in the form of a clevis with first and second lugs movably connected to the first and second ends of the bolt assembly. The second end of the drive yoke is connected to the door or aerodynamic surface.

Thus when the actuator assembly moves the cam follower along the longitudinal axis, the first and second bearings coupled to the cam follower by bolt assembly move along a helical path in the slots. This rotates and translates the drive yoke along the longitudinal axis causing the door or aerodynamic surface to move.

Preferably the actuator assembly is a double acting hydraulic actuator. However, a first and second hydraulic actuators could be coupled to each end of the cam follower with one moving it one direction and the other in the opposite direction. Regardless, of the number of actuators, they can be rotatably connected to the cam follower so that the piston and piston rod do not have to rotate as they translate. The helical slots can be tailored with a helix angle that varies along the longitudinal axis to provide varying mechanical advantage.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of the limits of the invention.

BRIEF DESCRIPTION OF THE DRAWINGS

FIG. 2 is an end view of the rotary actuator in the closed position.

FIG. 3 is a cross-sectional view of the rotary actuator shown in FIG. 1 taken along the line 3—3.

DESCRIPTION OF THE PREFERRED EMBODIMENT

Figure 1:
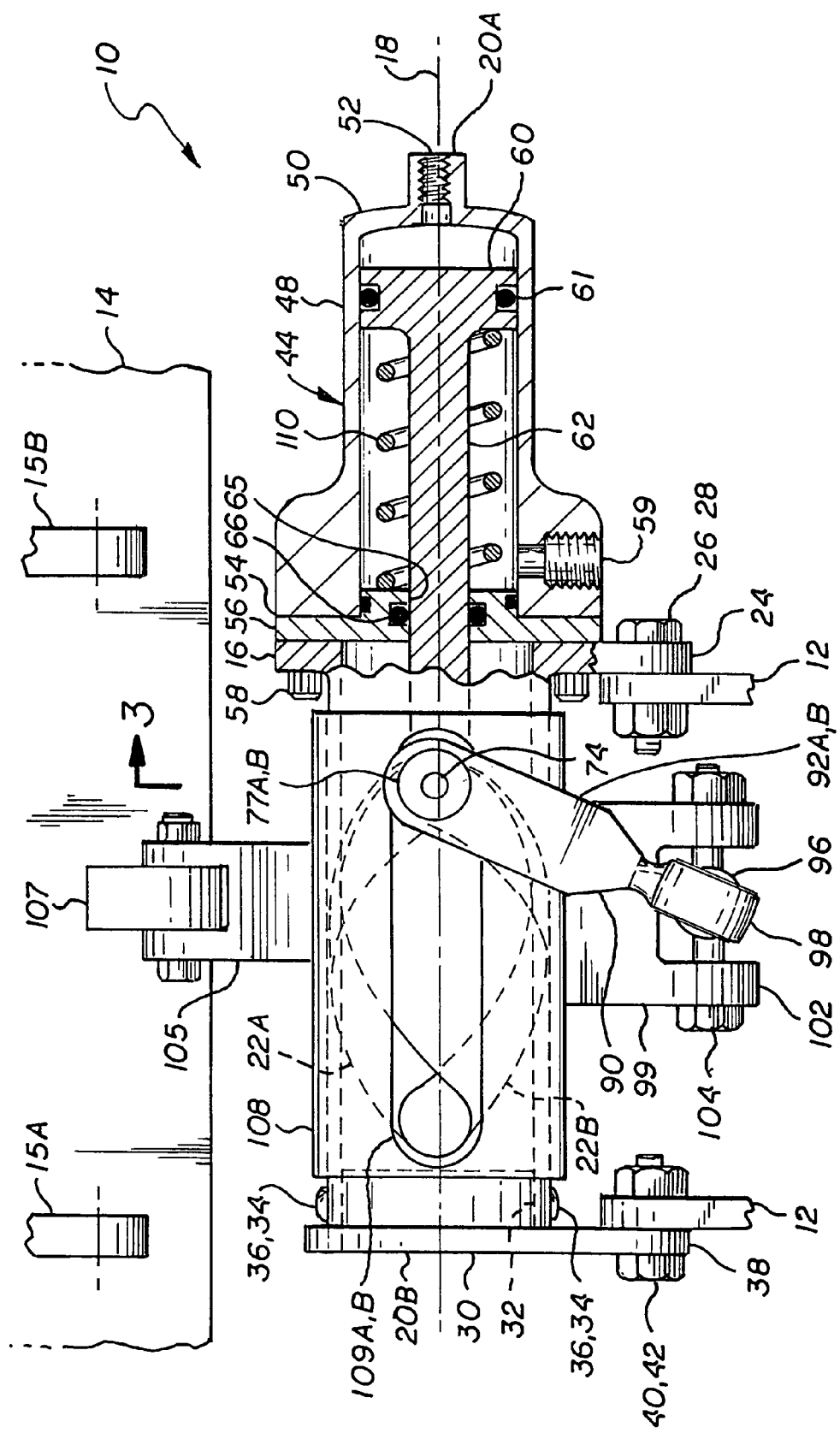
FIG. 1 is a side view of the rotary actuator in the closed position
Figure 4:
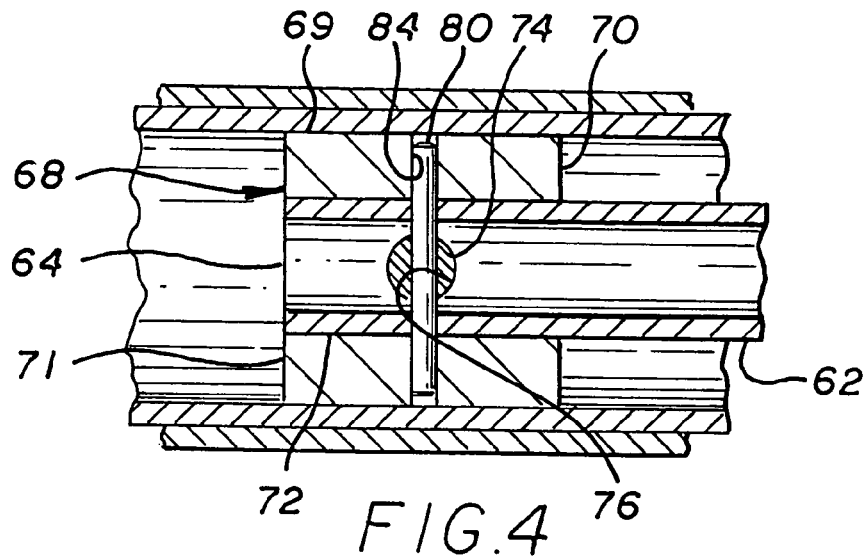
FIG. 4 is a cross-sectional view of the rotary actuator shown in FIG. 2 taken along the line 4—4.

Referring to FIGS. 1–4, the subject rotary actuator, generally indicated by numeral 10 is shown mounted in an aircraft structure 12 coupled to a door 14. As illustrated, the door 14 is an auxiliary air inlet door to the engine of a fighter aircraft. The door 14 is rotatably supported by two hinges 15A and 15B to the aircraft structure 12. However, it could be used to actuate aerodynamic surfaces such as stall fences or dive brakes, etc. The actuator 10 includes a central hollow support member 16 having a longitudinal axis 18 and first and second ends 20A and 20B and two evenly space helical slots 22A and 22B running along the longitudinal axis. Attached at the end 20A is a flange 24 attached to the aircraft structure 12 by means of fastener assemblies 26 extending through holes 28 in the aircraft structure and flange. The end 20B incorporates a cap 30 having a sleeve 32 extending within the member 16 and secured thereto by fastener assemblies 34 extending through holes 36 in the sleeve and member. The cap 30 further includes a flange 38 for attaching to the structure 12 by means of fastener assemblies 40 extending through holes 42 in the flange and structure.

A double acting hydraulic actuator 44 is mounted to the member 16 in a manner to be subsequently discussed. The hydraulic actuator 44 includes a hollow cylinder 48 having a closed off first end 50 with a fluid inlet/outlet port 52 coupled to a hydraulic line (not shown). The second end 54 of the hydraulic cylinder 48 is also closed off and includes a flange 56 that mates with flange 24 and is secured by fastener assemblies 58 extending through holes in the flanges. The second end 54 further includes a second inlet/outlet port 59. A piston 60, incorporating sealing assemblies 61, and which is slide ably and rotatably mounted therein. A piston rod 62 attached to the piston 60, includes an end 64 that engages hole 65 in the end 54 and extending into the support member 16. The hole 65 includes a sealing assembly 66 for sealing off the piston rod 62.

Movably mounted within the member 16 is a cam follower assembly 68, which includes a carrier 69, having first and second ends 70 and 71, with end 71 having a bore 72 there through for receiving the end 64 of the piston rod 42. The cam follower 68 includes a carrier 69 includes rollers 77A and 77B that ride in slots 22A and 22B and are secured thereto by bolt assembly 74, which passes through hole 76 extending through the carrier 69 and piston end 64. A pin 80 extends through a hole 84 in the carrier 69, the bolt assembly 74 and end 64 of the piston rod 62 securing them all to the carrier.

A Yoke type member 90 having a first end terminating in arms 92A and 92B is connected to the ends of the bolt assembly 74 outboard of the rollers 77A and 77B. The bolt assembly 74 includes threaded ends 94A and 94B which are mounted nuts 75A and 75B. Thus nuts 96A and 96B not only secure the member 90 to the bolt, but secure the rollers 77A and 77B in the slots 22A and 22B. The second end 98 of the member 90 is rotatably connected to an intermediate link 99 having a first end in the form of a clevis 102. The second end 98 of the member 90 contains a spherical bearing 102 mounted on a bolt assembly 104 secured to the clevis 102. The second end of the intermediate link 99 is also in the form of clevis 105 rotatably mounted to a lug 107 mounted on the door 14. A hollow sleeve 108 is mounted on the member 16 having two elongated slots 109A and 109B into which the bolt assembly 74 extends. The sleeve 108 can both translate along the longitudinal axis 18 of the member 16 as well as rotate thereabout. This sleeve 108 helps to prevent any debris from entering the slots and jamming the mechanism.

Figure 5:
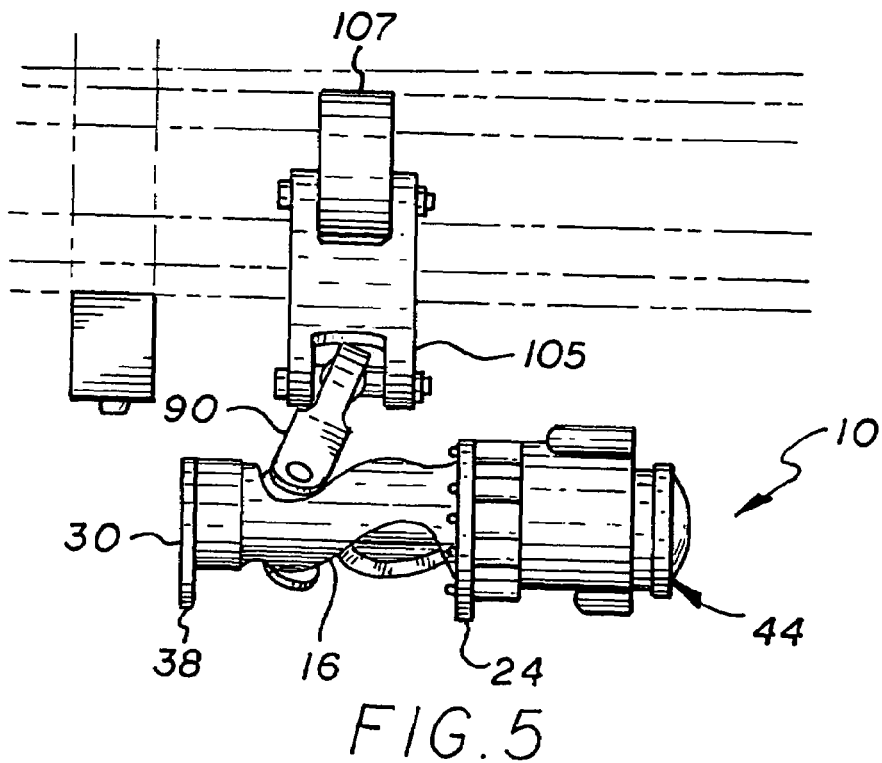
FIG. 5 is a side view of the rotary actuator in the partially open position.
Figure 6:
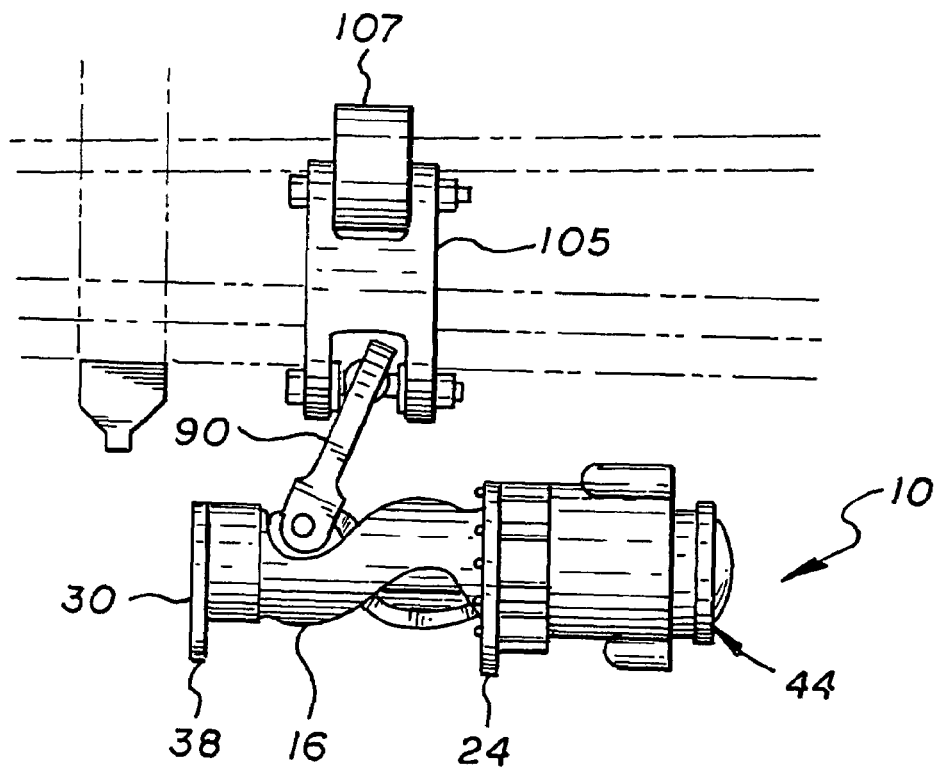
FIG. 6 is a side view of the rotary actuator in the fully open position.

Still referring to FIGS. 1–4 and additionally to FIGS. 5 and 6, it can be seen that when the piston is pressurized through port 52, the piston 60 and piston rod 62 translate moving the carrier 69 to the left. This causes the rollers 77A and 77B to also translate. Because the rollers 77A and 77B ride in the helical slots 22A and 22B, the bolt assembly 74 translates in a helical path and rotates. The member 90, attached to the carrier 69, also rotates and translates along the longitudinal axis 18 of the member 16. This causes the door 14 to rotate to the open position, with the spherical bearing 102 absorbing angular changes between the member 90 and clevis 105 of the link 99. Note that the sleeve 108 rotates and translates along with the member 16.

To close the door 14, the port 52 is vented and hydraulic fluid is applied to port 59 and port 52 is vented, causing the piston 60 to move to the right, reversing the action. That is, the cam follower assembly 68 moves to the right causing the door to close. A spring 110 may be installed between the piston 60 and second end 54 of the cylinder 48 biasing the piston to the right. This will eliminate the need for hydraulic pressure to be continuously applied to port 59 in order to maintain the door 14 in the closed position.

Figure 7:
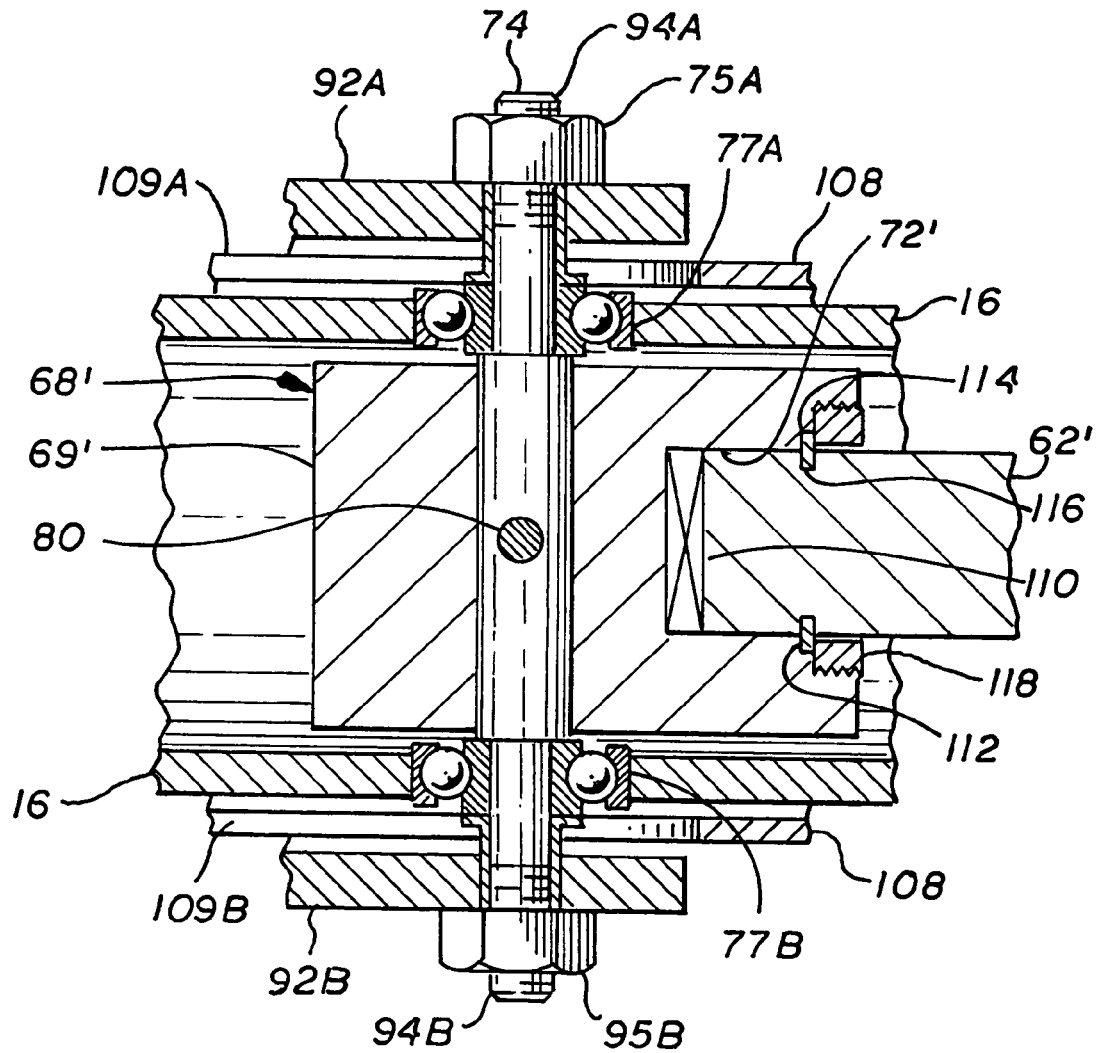
FIG. 7 is a partial cross-sectional view of the rotary actuator illustrating a design allowing the cam follower to rotate independently of the piston and piston rod translation.

In the version discussed above, the piston 60 and piston rod 62 were attached to the carrier 69. Thus the piston and piston rod will rotate upon actuation. This can be accommodated by the use of commercially available T seals in the sealing assemblies 61 and 54. Of course the piston rod 62 could be rotatably connected to the carrier 69. Referring to FIG. 7, this would be accomplished by mounting a thrust bearing 110 in the hole 70' and securing the rod 62' to the carrier 69' by a snap ring 112 mounted in a grooves 114 and 116 in the rod 62' and hole 70' and secured by threaded nut 118.

Figure 8:
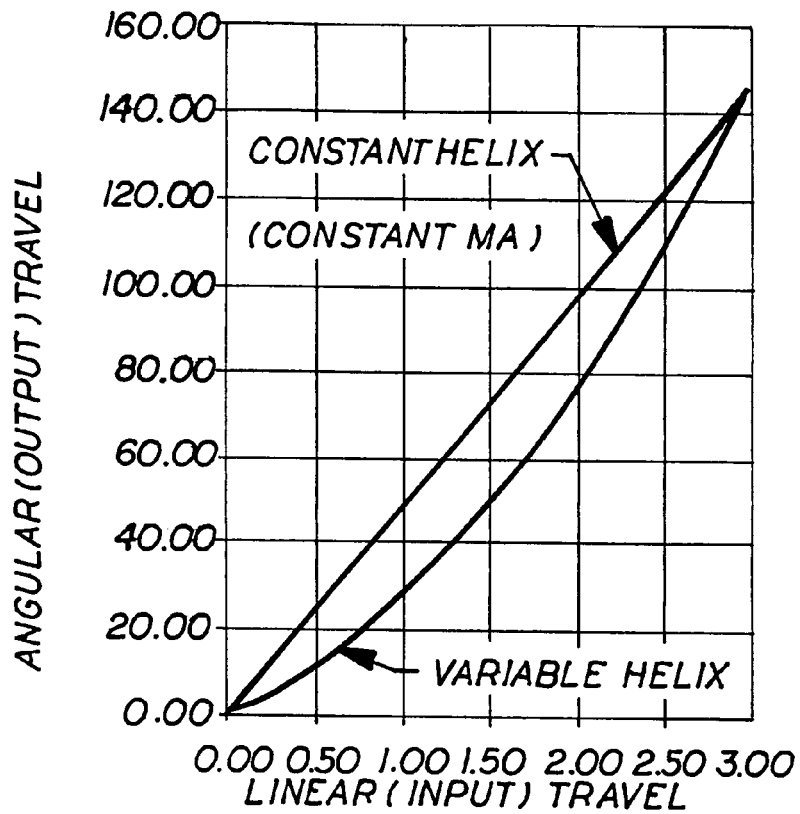
FIG. 8 is graph of output travel verses angular travel for the actuator comparing a constant helix to a non-constant helix
Figure 9:
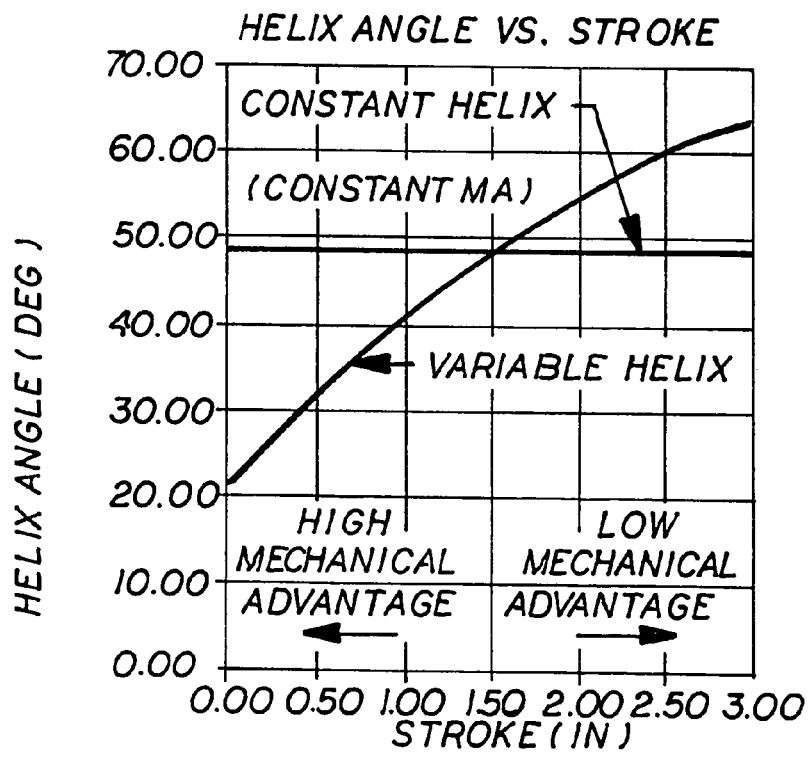
FIG. 9 is a graph of the helix angle verses stroke for the actuator comparing a constant helix to a non-constant helix
Figure 10:
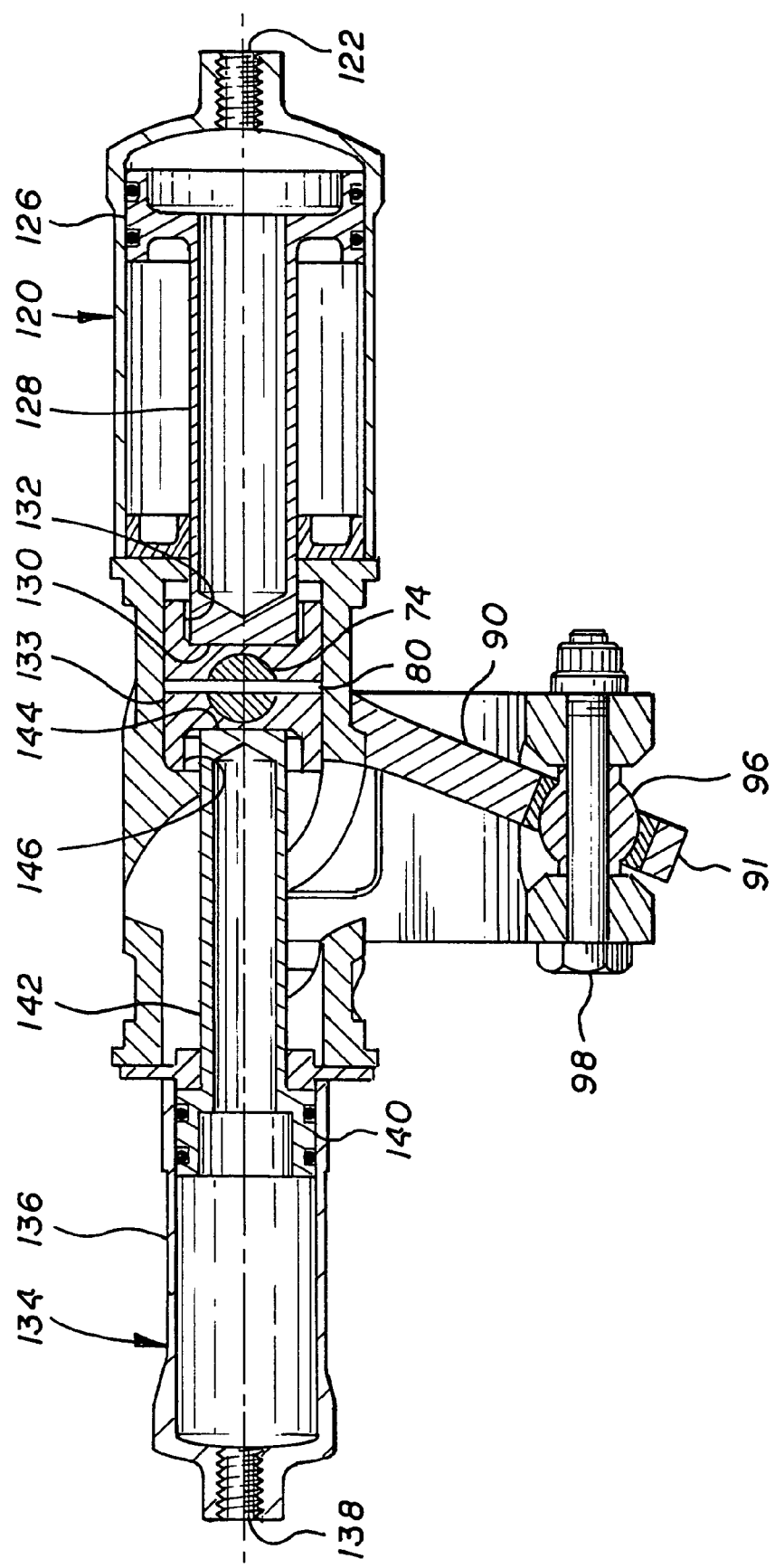
FIG. 10 is a cross-sectional view of a second embodiment using two actuators.

Still referring to FIGS. 1–6 and additionally to FIGS. 8 and 9, the helical slots 22A and 22B are designed so that the member 90 is over-center when the door 14 is in the open position, locking the member 90 in place preventing the loads on the door from closing it. FIG. 9 present a graph of angular travel versus linear travel for linear and non-linear helical slots, while FIG. 10 presents a graph of stroke verses helical angle for both linear and non-linear helical slots. Notice that velocity ratio is inversely proportional to the mechanical advantage. Thus by using a non-linear helix, the actuation forces on the door are highest as the door opens.

A second embodiment is presented in FIG. 10. Note that identical parts retain the same numerical identification. The actuator 120 is a single port actuator with an inlet port 122. The actuator 120 includes a piston 126 and piston rod 128 having its end 130 in contact with a recess 132 in the carrier 133. A second actuator 134 is coupled to flange 24 of the support member 16 having a hydraulic cylinder 136 with an inlet/outlet port 138. It also includes a piston 140 and piston rod 142. The end 144 of the piston rod 142 contacts a recess 146 in the carrier 133. Thus actuator 120 moves the carrier 133 to the left, (opening the door 14) and actuator 134 moves the carrier 133 to the right) closing the door). Note that the piston rod 142 is not pined to the carrier 133 and the pin 80 only secures the bolt assembly 74. Additionally, it can be seen that the actuator 134 is smaller in size than actuator 120 because required closing forces are normally smaller than those required to open the door. However, in some applications the forces may be equal, while in others the size of the actuators may be reversed While the invention has been described with reference to particular embodiments, it should be understood that the embodiment are merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to the aircraft manufacturing industry.

The invention claimed is:

1. An actuator assembly comprising:
   a housing having first and second ends and a longitudinal axis, said housing center portion having first and second helical slots extending along said longitudinal axis;
   a member, having first and second ends, movably mounted with said center portion, said member movable along said longitudinal axis;

means to actuate said member in first and second directions along said longitudinal axis;

a pin having first and second ends mounted through said member and having said first and second ends extending into said first and second helical slots;

first and second bearings mounted to said first and second ends of said pin, said first and second bearings mounted in said first and second helical slots;

an actuation rod having a first and second ends, said first end in the form of a clevis having first and second lugs, said first and second lugs mounted to said first and second ends of said pin.

2. The actuator assembly as set forth in claim 1 wherein said means comprises:

a first hydraulic cylinder having a first piston coupled to said first end of said movable member for moving said member in a first direction along said longitudinal axis; and a second hydraulic cylinder having a second piston coupled to said second end of said member for moving said member in a second direction along said longitudinal axis.

3. The actuator assembly as set forth in claim 1 wherein said means comprises a double action hydraulic cylinder having a piston coupled to said first end of said movable member for moving said member back and forth along said longitudinal axis.

4. The actuator as set forth in claim 1, or 2, or 3 wherein said helical slots are non-constant.

5. The actuator assembly as set forth in claim 1, or 2, or 3, wherein said member is rotatably coupled to said first and second hydraulic actuators.

6. A movable surface assembly for an aircraft comprising:

a movable surface rotatably mounted to the aircraft structure, said surface movable from a closed position to an open position by means of a control arm;

an actuator assembly comprising:

a housing having first and second ends and a longitudinal axis, said housing center portion having first and second helical slots extending along said longitudinal axis;

a member, having first and second ends, movably mounted with said center portion, said member movable along said longitudinal axis;

means to actuate said member in first and second directions along the longitudinal axis;

a pin having first and second ends mounted through said member and having said first and second ends extending into said first and second helical slots;

first and second bearings mounted to said first and second ends of said pin, said first and second bearings mounted in said first and second helical slots;

an actuation rod having a first and second ends, said first end in the form of a clevis having first and second lugs, said first and second lugs mounted to said first and second ends of said pin, said second end coupled to said control arm of said surface.

7. The aerodynamic control surface assembly as set forth in claim 6 wherein said means comprises a first hydraulic cylinder having a first piston coupled to said first end of said movable member for moving said member in a first direction along said longitudinal axis; and a second hydraulic cylinder having a second piston coupled to said second end of said member for moving said member in a second direction along said longitudinal axis.

8. The surface assembly as set forth in claim 7 wherein said member is rotatably coupled to said first and second hydraulic actuators.

9. The actuator assembly as set forth in claim 6 wherein said means comprises a hydraulic cylinder having a piston coupled to said first end of said movable member for moving said member back and forth along said longitudinal axis.

* * * * *

UNITED STATES PATENT AND TRADEMARK OFFICE
CERTIFICATE OF CORRECTION

PATENT NO. : 7,185,852 B2
APPLICATION NO. : 10/953230
DATED : March 6, 2007
INVENTOR(S) : John Trouy Kannapell Page 1 of 1

It is certified that error appears in the above-identified patent and that said Letters Patent is hereby corrected as shown below:

Item -73- on the title page the assignee should appear as follows:
--Northrop Grumman Corporation.--

Signed and Sealed this

Eighteenth Day of March, 2008

JON W. DUDAS
*Director of the United States Patent and Trademark Office*